United States Patent [19]
Lindgren et al.

[11] Patent Number: 5,567,223
[45] Date of Patent: Oct. 22, 1996

[54] METHOD FOR DEALING WITH MERCURY-CONTAINING WASTE

[75] Inventors: Per-Olov Lindgren, Skellefteå; Karin Paulsson, Skelleftehamn; Anna Svedberg, Skellefteå, all of Sweden

[73] Assignee: Boliden Mineral AB, Skelleftchamn, Sweden

[21] Appl. No.: 332,742

[22] Filed: Nov. 1, 1994

[30] Foreign Application Priority Data

Nov. 25, 1993 [SE] Sweden ............................. 9303905

[51] Int. Cl.$^6$ .............................................. C22B 43/00
[52] U.S. Cl. ........................ 75/401; 75/407; 75/670; 423/509
[58] Field of Search ................ 75/670, 401, 10.29, 75/407; 423/509

[56] References Cited

U.S. PATENT DOCUMENTS 4,606,762  8/1986  Sikander et al. .
5,232,488  8/1993  Sanchez et al. .

FOREIGN PATENT DOCUMENTS 117865  9/1984  European Pat. Off. .
WO92/10240  6/1992  WIPO .

*Primary Examiner*—Melvyn Andrews
*Attorney, Agent, or Firm*—Burns, Doane, Swecker & Mathis

[57] ABSTRACT

A method for dealing with mercury-containing waste including button-type batteries, wherein the waste is heated in a furnace while being agitated and in the presence of elementary selenium vapour in an amount sufficient to form mercury-selenide from essentially all the mercury contained by the waste. The waste is heated to a temperature at which mercury and selenium will be present in a gaseous state and at which solid mercury-selenide will not form, and a partial pressure of oxygen is maintained at a sufficiently low level to avoid oxidation of the selenium. The thus treated mercury-freed waste is extracted from the resultant process gas and from any other solid material that may be present and is either dumped or worked-up metallurgically. After the waste has been extracted from the process gas, the process gas is cooled to extract therefrom solid, stable mercury-selenide dust suitable for dumping, whereafter the gas is passed through a filter with the intention of extracting any gaseous mercury that may remain in the gas, whereafter the thus cleansed gas is released into the atmosphere. The invention also relates to a plant for treating mercury-containing waste.

21 Claims, 1 Drawing Sheet

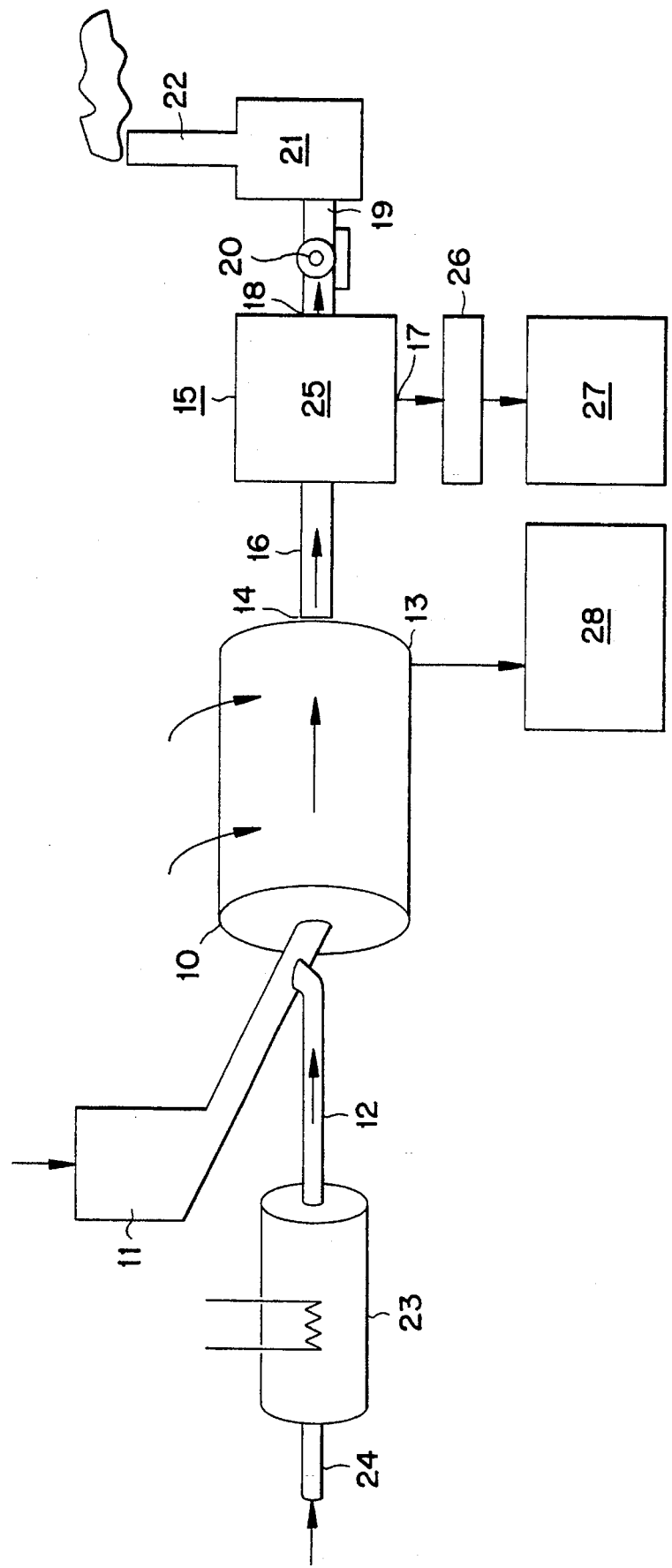

METHOD FOR DEALING WITH MERCURY-CONTAINING WASTE

FIELD OF THE INVENTION

The present invention relates to a method and to a plant for treating mercury-containing waste, such as so-called button-type batteries in particular, wherein the waste is heated in the presence of selenium.

BACKGROUND OF THE INVENTION

The use of mercury-containing button batteries has increased progressively over recent years and such batteries are now used in progressively more applications, for instance in clocks, photographic apparatus, mini-calculators and hearing aids.

The mercury content of this type of battery varies from tenths of a percent up to about 35%. The remainder of the battery is comprised mostly of iron, zinc, nickel and chromium. About 10 ton of such batteries are sold annually in Sweden. A rough estimate with regard to Europe as a whole is about 500 tons.

It is estimated that about 85% of these button batteries are collected as scrap in Sweden. These batteries are taken, together with other small batteries, to a central plant where they are stored for destruction or final dumping. Since there is still no attractive alternative to destruction, large quantities of these batteries remain in storage. Disposal of batteries that have not been destroyed is an expensive process and is, of course, encumbered with rigorous safety requirements. Thus, there is a considerable need for a destruction method which is suitable for application with such mercury-containing waste, particularly when incitement must be found to increase the extent to;which such batteries are collected, so as to prevent these batteries accompanying typical domestic waste and being dumped on waste tips around the country. Batteries that have not been collected as a matter of routine represent a time-fused environmental bomb. In ten or a hundred years from the time of being dumped, mercury is liable to leak from such batteries in an uncontrolled fashion. This latent threat is even more frightening when viewed on a worldwide basis, where the routine collection of mercury-containing batteries is far less organized than in Sweden.

A method of the kind defined in the introduction has been proposed in International Patent Application WO92/10240. According to this method, waste in the form of fluorescent tubes and the like as well as button-type batteries, are melted down to form a glass melt in a closed reactor, with the intention that resultant HgSe will bind chemically to the glass. The glass is then moulded into briquettes which can be dumped in dumps intended therefor. Thus, when practicing this known method, the waste is destroyed and mercury binds to the waste residue, hopefully in a stable form. The residue is still classified as environmentally hazardous waste and must therefore be disposed of as such.

EP-A-0117865 proposes a method and an arrangement for heating waste in the form of button-type batteries in a rotary furnace, wherein an oxidizing gas is delivered to the furnace for combusting burnable material in the waste and for transporting mercury released in the combustion process from the furnace. The process gas is then purified in a separate gas wash. This waste residue must also be considered as environmentally hazardous waste, since there is a danger of mercury remaining in the residue as a result of oxidation or as a result of recondensing in the waste residue. This danger is also found in the above mentioned method in which selenium is supplied to the system, since the method is carried out in a closed reactor with no agitation or gas transportation.

Accordingly, there is a need for a method which will enable mercury-containing waste to be treated in a manner which will prevent unintentional contamination of the waste residue with mercury to the greatest possible extent, and to enable a mercury-free residue to be formed which can be worked-up with respect to any metal values that may be present or can be dumped without needing to treat the residue as environmentally hazardous waste.

SUMMARY OF THE INVENTION

It has now surprisingly been found possible to treat waste of the aforedescribed kind in a manner which is both simple and friendly to the environment. In principle, the waste is treated in a way which Converts environmentally hazardous mercury to a chemically stable form having essentially no vapour pressure when dumping, and of converting the waste to a mercury-free form which can be further processed and the metal content recovered therefrom. Treatment is effected in an apparatus in which the stable mercury form is obtained and in which this stable mercury form can be separated from material residues in the absence of appreciable mercury residues. These residues can then be processed in conventional metallurgical processes, either in iron manufacturing processes or non-ferrous manufacturing processes.

To this end, the invention is characterized by the features set forth in the following appended method and apparatus claims.

According to the inventive method, the waste is heated in a furnace while agitating or stirring the waste. To this end, it is convenient, and simplest, to use a rotary furnace, although other types of furnaces which include an agitating facility can be used. Heating takes place in the presence of elementary selenium vapor in an active quantity sufficient to form mercury selenide from essentially the entire mercury content of the waste. The waste is heated to a temperature at which mercury and selenium will be present in gas phase and at which solid mercury selenide is unable to form, and at a partial pressure of oxygen which is sufficiently low to avoid selenium oxidation. The treated mercury-freed waste is separated from the resultant process gas and possibly also from other solid materials present and is then dumped or worked-up metallurgically. Subsequent to extracting the waste from the process gas, the gas is cooled to extract solid, stable mercury-selenide dust suitable for dumping. The gas is then passed through a filter, suitably a selenium filter or a carbon filter which extracts any gaseous mercury that may remain, and the thus cleansed gas is released the atmosphere.

The waste is preferably heated to a temperature of 600°–850° C., within which range mercury and selenium can be maintained in a gas phase with a good margin, and in which solid HgSe will not precipitate. The requisite low partial pressure of oxygen is preferably achieved by supplying an inert gas to the furnace. A suitable and inexpensive inert gas is nitrogen gas, for instance. It may also be necessary to supply a reducing gas, such as sulphur dioxide, $SO_2$. Other inert gases can, of course, also be used, depending on price and availability. The necessary presence of selenium vapor, so as to maintain an active vapor pressure furnace, is preferably achieved by supplying selenium metal to the furnace or by delivering selenium vapor together with the inert gas. The resultant process gas is cooled in a condenser, in which the mercury-selenide dust is extracted.

The invention also relates to apparatus for treating the waste, this apparatus including a furnace, preferably a rotary furnace, having means for delivering waste and inert gas to the furnace and means for removing treated waste therefrom. The furnace is constructed to work at an underpressure, but avoiding air leaking into the furnace. Connected to the furnace is a condenser having an outlet for bed material, and the condenser, in turn, is connected to a filter in which gaseous mercury is extracted from the process gas. A suitable filter is a selenium filter or a carbon filter. The furnace is preferably heated indirectly.

BRIEF DESCRIPTION OF THE DRAWING

The FIGURE shows a schematic diagram of a preferred plant according to the present invention.

DETAILED DESCRIPTION OF THE INVENTION

The invention will now be described in more detail with reference to a practical exemplifying embodiment thereof and also with reference to the accompanying drawing, the single FIGURE of which illustrates schematically a preferred plant according to the invention. The illustrated plant includes a rotary furnace 10 having a solid-material delivery means 11 and a gas delivery means 12. The furnace 10 includes at its outlet end an outlet 13 for solid products and a gas outlet 14 which is connected to a condenser 15 by means of a gas conduit 16. The condenser 15 is provided with a solid-material bottom outlet 17 and is provided on one side with a gas outlet 18 which is connected to a selenium filter 21 through the medium of a gas conduit 19 and a fan 20. The selenium filter 21 communicates with the atmosphere through a gas outlet 22, which in the illustrated case has the form of a smoke stack or chimney. For supplying gaseous selenium to the furnace with inert gas, the gas delivery means 12 is connected to a gas-heating device 23 to which inert gas can be delivered through a conduit 24.

When using the plant, the furnace 10 is charged continuously with waste material that is to be dealth with, for instance button-type batteries, and selenium and a mercury-free residue is taken out continuously through the outlet 13 and separated. This enables the selenium to be supplied together with the waste material through the solid-material delivery means 11, this material being delivered together with the inert gas through the gas delivery means 12. As shown in the drawing, the inert gas and selenium are delivered in concurrent flow with the solid material, although a countercurrent process may also be applied. The selenium delivered to the furnace 10 in metal form is vaporized in the furnace, whereas the selenium that is delivered together with the inert gas is vaporized in the gas-heating device 23, to which the selenium is delivered in some suitable way and in some suitable form. The method with which the selenium is supplied will depend on the material to be destroyed and later recovered. When selenium metal is charged directly to the furnace 10, there is a danger that selenium will be lost in the form of alloys that form with the metal content of the waste residue.

The furnace 10 will preferably be heated indirectly, so as to obtain concentrated process gases from which the stable mercury-containing dust shall be sublimated. It should also be possible to adapt the furnace temperature to the material to be treated and to be able to maintain the temperature at the correct level. The whole arrangement is constructed to work at an underpressure and the only gas that is allowed to enter the furnace 10 is the inert gas. The furnace 10 may also include an after-combustion chamber (not shown) for combusting organic constituents in the waste.

Heat can be transferred directly to the treated material from the furnace shell or mantle. Mercury-free waste residue is separated at the outlet end of the furnace 10 through the outlet 13. This separation process is effected at a temperature which is sufficiently high to ensure that mercury-selenide dust will not sublime onto the surfaces of the residue.

The mercury-free waste residue discharged from the plant can either be dumped or worked-up. Both of these alternatives can be symbolized by the process stage 28. The metals contained in battery-rests can be recovered as products in conventional metallurgical processes, or converted to a form in which they can be suitably dumped, for instance in slag form, during these processes. When the metals are converted to fayalite slag (iron silicate), these metals will bind to a form that is suitable from a dumping aspect, since the resultant slag can be considered stable against leaching.

The process gas, which now contains gaseous mercury and selenium, is sucked from the furnace 10 through the gas outlet 14 and flows through the gas conduit 16 to the condenser 15, in which mercury-containing dust is caused to sublime in the condenser space 25. The dust is removed through the outlet 17 and passed to a packing station 26, in which it is suitably packaged for final storage in a depot 27. Process gas is sucked from the condenser 15 through the conduit 19 with the aid of the fan 20, and is passed to the selenium filter 21 where any remaining mercury vapour is effectively taken-up, whereafter an inert, clean process gas can be released to atmosphere through the chimney 22. If necessary, because of other reactions in the material, the gas purifying process can be supplemented with other appropriate equipment functioning to remove other contaminants hazardous to the health.

EXAMPLE

A rotary furnace having a length of 1 m and a diameter of 0.8 m was charged continuously with 100 g/hour mercury-containing button-type batteries. Each battery contained on average 2.1% by weight mercury. The furnace was also charged with selenium at a rate of 10 g/hour, and 300 l/hour nitrogen gas. The test was run for 4 hours and the batteries remained in the furnace for 1.2 hours. The furnace temperature was 700° C. It was established that 99.1% of the mercury input was expelled. 97% of the mercury condensed as dust in a condenser and the remaining mercury was captured in a selenium filter downstream of the condenser.

The dust contained 29.5% Hg and 32.6% Se and it was possible to show HgSe by X-ray diffraction.

What is claimed is:

1. A method for treating mercury-containing waste, the method comprising the steps of:
   (a) agitating and heating the mercury-containing waste in a furnace in the presence of elementary selenium vapor in an amount effective to form mercury selenide from essentially all of the mercury in the mercury-containing waste at a temperature at which mercury and selenium will exist in the gas phase and at which no solid mercury selenide will form to produce (i) a process gas comprising mercury and selenium, and (ii) a substantially mercury-free waste,
   (b) maintaining a sufficiently low partial pressure of oxygen in the furnace to avoid selenium oxidation;

(c) separating the process gas from the substantially mercury-free waste to form a separated process gas;

(d) cooling the separated process gas and extracting therefrom solid, stable mercury-selenide dust;

(e) extracting any gaseous mercury remaining in the separated process gas from step (d) to produce a cleansed process gas; and (f) releasing the cleansed process gas into the atmosphere.

2. The method according to claim 1, wherein the mercury-containing waste comprises button batteries.

3. The method according to claim 1, further comprising dumping the substantially mercury-free waste or recovering metal values from the substantially mercury-free waste.

4. The method according to claim 1, wherein any gaseous mercury remaining in the separated process gas from step (d) is extracted using a filter.

5. The method according to claim 1, wherein the mercury-containing waste is heated to a temperature of 600°–850° C.

6. The method according to claim 1, further comprising introducing an inert gas into the furnace to maintain the low partial pressure of oxygen.

7. The method according to claim 5, further comprising introducing an inert gas into the furnace to maintain the low partial pressure of oxygen.

8. The method according to claim 1, further comprising introducing solid selenium or selenium vapor together with an inert gas into the furnace to maintain an active selenium vapor pressure in the furnace.

9. The method according to claim 5, further comprising introducing solid selenium or selenium vapor together with an inert gas into the furnace to maintain an active selenium vapor pressure in the furnace.

10. The method according to claim 6, further comprising introducing solid selenium or selenium vapor together with an inert gas into the furnace to maintain an active selenium vapor pressure in the furnace.

11. The method according to claim 7, further comprising introducing solid selenium or selenium vapor together with an inert gas into the furnace to maintain an active selenium vapor pressure in the furnace.

12. The method according to claim 1, further comprising introducing a reducing gas into the furnace to avoid selenium oxidation.

13. The method according to claim 12, wherein the reducing gas is $SO_2$.

14. The method according to claim 1, wherein the separated process gas is cooled in a condenser having cold surfaces on which the mercury-selenide dust is extracted from the separated process gas.

15. The method according to claim 5, wherein the separated process gas is cooled in a condenser having cold surfaces on which the mercury-selenide dust is extracted from the separated process gas.

16. The method according to claim 6, wherein the separated process gas is cooled in a condenser having cold surfaces on which the mercury-selenide dust is extracted from the separated process gas.

17. The method according to claim 7, wherein the separated process gas is cooled in a condenser having cold surfaces on which the mercury-selenide dust is extracted from the separated process gas.

18. The method according to claim 8, wherein the separated process gas is cooled in a condenser having cold surfaces on which the mercury-selenide dust is extracted from the separated process gas.

19. The method according to claim 9, wherein the separated process gas is cooled in a condenser having cold surfaces on which the mercury-selenide dust is extracted from the separated process gas.

20. The method according to claim 10, wherein the separated process gas is cooled in a condenser having cold surfaces on which the mercury-selenide dust is extracted from the separated process gas.

21. The method according to claim 12, wherein the separated process gas is cooled in a condenser having cold surfaces on which the mercury-selenide dust is extracted from the separated process gas.

* * * * *